United States Patent [19]
Kohara et al.

[11] Patent Number: 5,153,068
[45] Date of Patent: Oct. 6, 1992

[54] COATED PARTICLE

[75] Inventors: Minoru Kohara, Kyoto; Kunikazu Yamada, Shiga; Kazuo Saiuchi, Ohtsu; Yukio Ohtsuka; Kazuhiko Kanki, both of Uji; Yutaka Shibata, Kusatsu, all of Japan

[73] Assignee: Sekisui Fine Chemical Co., Ltd., Osaka, Japan

[21] Appl. No.: 545,007

[22] Filed: Jun. 28, 1990

[30] Foreign Application Priority Data

Jun. 29, 1989 [JP] Japan .................. 1-169008
Jun. 29, 1989 [JP] Japan .................. 1-169009
Jul. 31, 1989 [JP] Japan .................. 1-199546
Feb. 26, 1990 [JP] Japan .................. 2-46492

[51] Int. Cl.$^5$ .................. B32B 5/16
[52] U.S. Cl. .................. 428/405; 428/406; 428/407
[58] Field of Search .................. 428/403, 405, 425.5, 428/407, 406; 252/62.54

[56] References Cited

U.S. PATENT DOCUMENTS 4,672,040 6/1987 Josephson .................. 252/62.54
4,695,393 9/1987 Whitehead .................. 428/405

FOREIGN PATENT DOCUMENTS 57-189117 11/1982 Japan .
59-24829 2/1984 Japan .
62-195623 8/1987 Japan .
1476121 3/1979 United Kingdom .

Primary Examiner—Edith L. Buffalow
Attorney, Agent, or Firm—Armstrong & Kubovcik

[57] ABSTRACT

A coated color particle with extremely low susceptibility to decoloring is provided. The coated color particle comprises a colored core particle and a coating layer formed on the surface of the core particle, wherein the coating layer is formed by treatment of the core particle with an agent selected from the group consisting of silane compounds, silyl isocyanates, and organic titanium compounds.

20 Claims, 1 Drawing Sheet

COATED PARTICLE

This invention was made with government support under NS26799 and RFD 263-88-P(81)-0154 awarded by NIH. The government has certain rights in the invention.

BACKGROUND OF THE INVENTION

1. Field of the invention

The present invention relates to coated color particles with extremely low susceptibility to decoloring, which are preferably used as particulate spacers for liquid crystal display cells. The present invention also relates to coated particles having excellent dispersibility and other desirable properties and therefore are highly appropriate for use as spacers for liquid crystal display cells, as standard particles for various measurements, as carriers for diagnostic tests, etc.

2. Description of the prior art

Inorganic or organic particles are widely used as particulate spacers in liquid crystal display cells, labelling materials such as fluorescent particles for flow cytometry in the biochemical field, standard particles in applications such as measurement of grain sizes by electron microscopy, carriers for immunological diagnostic reagents in diagnostic testing, etc.

As such particles, colored particles are used as required. For example, the colored particles are preferably used for spacers in liquid crystal display cells. Such colored particles are generally obtained by a coloring treatment of core particles with dyes or pigments. Known methods of obtaining such particles include, for example, those described in Japanese Laid-Open Patent Publication Nos. 57-189117 and 59-24829.

However, the colored particles obtained by the methods of the aforesaid Laid-Open Patent Publications are susceptible to loss of the coloring agent during use. For example, if colored particles of the aforesaid conventional types are exposed to water, various solvents, liquid crystals, acids or bases, then the coloring agent may be eluted from the colored particles, and hence nonuniformity of color appears, or in some cases complete decolorization of the particles occurs. Moreover, soiling or contamination of other objects or substances by the coloring agent eluted from the colored particles also constitutes a problem. Heretofore, no effective method for prevention of the decoloring of such colored particles has been proposed.

Particulate spacers used for liquid crystal cells are placed between two glass substrates and maintain a constant gap between the said pair of glass substrates. Since this gap must be maintained at a fixed width over the entire region of the said glass substrates, a large number of the particulate spacers are disposed at prescribed intervals between the substrates. In general, since the particulate spacers are made of fine particles, they are prone to aggregate, resulting in the formation of clumped aggregates of from several to several tens of particles. If particulate spacers are situated between the glass substrates in such an aggregated state, then the gap precision deteriorates. Furthermore, in the transmission type liquid crystal cells of black-and-white displays, such portions of the displays usually appear white, thereby lowering the contrast of the said black-and-white displays.

In order to improve the dispersibility of particulate spacers for liquid crystal cells, Japanese Laid-Open Patent Publication No. 62-195623 discloses a method that comprises a process of applying ultrasonic wave to the particulate spacers, thereby improving the dispersibility of the said spacers. However, the method requires a special apparatus, and is extremely impractical for industrial applications. The most effective method for this purpose would be the prevention of mutual aggregation of the particles by appropriate processing of the particles from an industrial viewpoint; however, no specific method of implementing such a process has yet been proposed in the prior art.

SUMMARY OF THE INVENTION

A coated colored particle of this invention, which overcomes the above-discussed and numerous other disadvantages and deficiencies of the prior art, comprises: a colored core particle and a coating layer formed on the surface of the core particle, wherein the coating layer is formed by treatment of the core particle with an agent selected from the group consisting of silane compounds, silyl isocyanates, and organic titanium compounds.

In a preferred embodiment, the coated color particle further comprises an intermediate layer disposed between the surface of the core particle and the coating layer; said intermediate layer being formed by treatment of the core particle with a silane compound; and said coating layer being formed by treatment of the surface of the intermediate layer with a silyl isocyanate.

A coated particle of this invention comprises a core particle, an intermediate layer and a coating layer which are successively formed on said core particle; said intermediate layer being formed by treatment of the core particle with a silane compound; and said coating layer being formed by treatment of the surface of the intermediate layer with an organic titanium compound.

The above-mentioned coated particles are preferably used as a particulate spacer for liquid crystal display cells.

Thus, the invention described herein makes possible the objectives of:

(1) providing colored particles in which the elution of coloring agent is efficiently prevented even during contact with water, organic solvents, liquid crystals, acids or bases, (2) providing colored particles such that, when used as labelling materials or labelling particles, verification of the presence of the particles is not obscured by loss of coloring agent, (3) providing colored particles such that, when used as diagnostic carrier materials, the assay medium is not contaminated by elution of colorants, thereby eliminating measurement errors, (4) providing colored particles such that, when used as spacers for liquid crystal cells, the displayed images can be clearly and distinctly visualized, (5) providing colored particles such that, when used as spacers for liquid crystal cells, the liquid crystal is not contaminated owing to the loss of coloring agent by the particles, (6) providing particles used as spacers for liquid crystal cells which permit pronounced improvement of the gap precision of liquid crystal cells by improving the dispersion characteristics of said particles, and (7) providing particles used as spacers for liquid crystal cells entirely free from minute blemishes or stains owing to aggregation of the said particles on the liquid crystal display surface.

BRIEF DESCRIPTION OF THE DRAWING

This invention may be better understood and its numerous objects and advantages will become apparent to those skilled in the art by reference to the accompanying drawing as follows.

DESCRIPTION OF THE PREFERRED EMBODIMENTS

Core Particles

Figure 1:
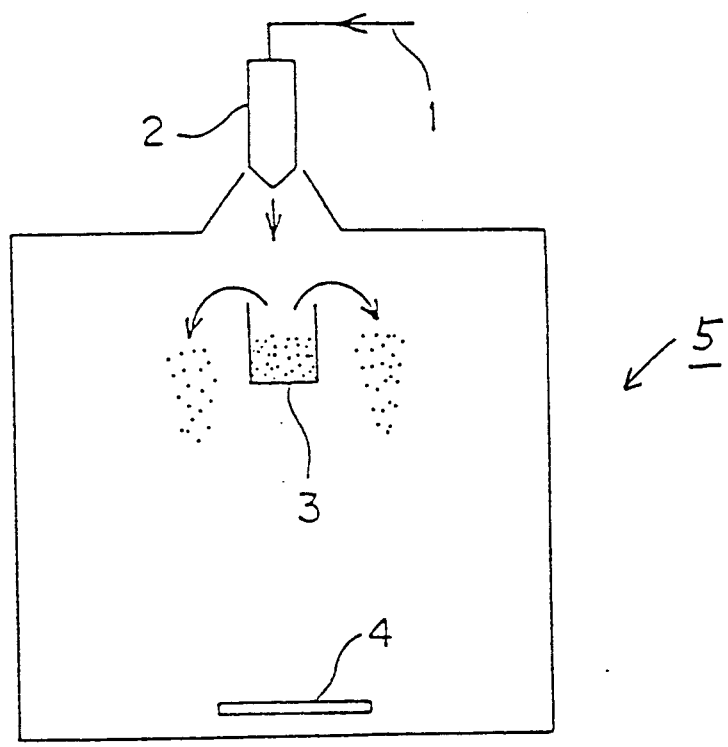
FIG. 1 is a perspective view of an apparatus for the evaluation of the dispersibility of particles used as spacers for liquid crystal display cells.

The core particles used in the present invention are solid particles made of resin or inorganic substance.

The types of resins suitable for the formation of such particles include the following: thermoplastic resins such as polyethylene, polypropylene, polymethylpentene, polyvinyl chloride, polytetrafluoroethylene, polystyrene, polymethyl methacrylate, polyethylene terephthalate, polybutylene terephthalate, polyamides, polyimides, polysulfone, polyphenyleneoxide, polyacetal; and thermosetting resins such as epoxy resins, phenol resins, melamine resins, unsaturated polyester resins, polydivinylbenzene, divinylbenzene-styrene copolymer, divinylbenzene-acrylate copolymers, polydiallylphthalate, polymer of triallyl isocyanurate, polymer of benzoguanamine, etc.

Among the aforesaid resins, those especially desirable for the formation of the core particles are thrmosetting resins such as melamine resins, polydivinylbenzene, divinylbenzene-styrene copolymer, divinylbenzene-acrylate copolymers, polydiallylphthalate, etc.

Moreover, the types of inorganic substances suitable for the formation of such core particles include the following: silicate glass, borosilicate glass, lead glass, soda-lime glass, alumina, alumina silicate, etc. Among these, silicate glass and borosilicate glass are especially suitable for the present purpose.

The shapes of the core particles are not restricted. However, particles of spherical, ellipsoidal or cylindrical shapes with the following dimensions are most suitable. For spherical particles, diameters in the range of 0.1 $\mu$m to 1000 $\mu$m are appropriate, and those in the range of 1 $\mu$m to 100 $\mu$m are especially desirable. For ellipsoidal particles, short-axis diameters in the range of 0.1 $\mu$m to 1000 $\mu$m are appropriate, and those in the range of 1 $\mu$m to 100 $\mu$m are especially desirable, while the ratio of long to short axis diameters should be in the range of 1 to 10, and more preferably in the range of 1 to 5. For cylindrical particles, diameters in the range of 0.5 $\mu$m to 1000 $\mu$m are appropriate, and those in the range of 3 $\mu$m to 100 $\mu$m are especially desirable, while the ratio of the length to the diameter of the cylinders should be in the range of 1 to 50, and more preferably 1 to 10. Ordinarily, the core particles used for the purposes of the present invention are of the types which are generally used for spacers for liquid crystal display cells, particles for labeling purposes, standard particles for various measurements, carriers for diagnostic tests, etc.

Colored Core Particles

The core particles are colored, as desired. In the case of resin particles, the coloring methods appropriate for use in obtaining the colored core particles include the following:

(1) Colorless core particles are treated with disperse dyes, acidic dyes or basic dyes;

(2) Carbon black or a metal oxide is mixed with monomers, and a polymerization reaction is carried out, resulting in colored resin particles; and (3) Carbon black or a metal oxide is blended with a polymer, and formed into resin particles.

In the case of core particles made of inorganic substances, a coloring method appropriate for use in obtaining the colored core particles includes the process of forming resin films on the surfaces of the inorganic particles, and then coloring these coated particles by decomposition or carbonization at high temperatures. Also, in cases where the material used for the formation of the particles is itself colored, the particles can, of course, be used without any particular additional coloring treatment.

In one embodiment of the present invention, colored core particles are obtained by first forming colorless core particles made of a cross-linked resin, and then coloring the said core particles by treatment with acidic treating agent, and then with a basic dye. The colorless core particles are obtained by the polymerization of ethylenically unsaturated monomers.

The said ethylenically unsaturated monomer comprises at least one ethylenically unsaturated group, and one or more kinds of monomers can be used in combination. For example, a monomer with one ethylenically unsaturated group, a monomer with two ethylenically unsaturated groups, or the mixture thereof can be used. In particular, the use of monomers possessing at least two ethylenically unsaturated groups in an amount of at least 5% by weight, and preferably 10% by weight based on the total weight of the ethylenically unsaturated monomers, is desirable. If the amount of monomers possessing at least two ethylenically unsaturated groups is less than 5% by weight, then the hardness of the colorless core particles so obtained is low, and moreover, these particles cannot be colored to a deep shade.

The monomers possessing at least two ethylenically unsaturated groups include the following types of monomers (1)-(4).

(1) x-methylolalkyl y-acrylates (or methacrylates) (wherein x and y are integers satisfying the condition $x \leq y \leq 2$). Specifically, this category includes, for example, tetramethylolmethane tetraacrylate (or tetramethacrylate), tetramethylolmethane triacrylate (or trimethacrylate), tetramethylolmethane diacrylate (or dimethacrylate), trimethylolpropane triacrylate (or trimethacrylate), dipentaerythritolhexa-acrylate (or -methacrylate), dipentaerythritolpenta-acrylate (or -methacrylate), glycerol triacrylate (or trimethacrylate) and glycerol diacrylate (or dimethacrylate), etc.

(2) Polyoxyalkylene glycol diacrylates (or dimethacrylates), specifically, this category includes, for example, polyethylene glycol diacrylate (or dimethacrylate), polypropylene glycol diacrylates (or dimethacrylate), etc.

(3) Triallyl cyanurates (or isocyanurates), triallyl trimellitate, etc.

(4) Divinylbenzene, diallyl phthalates, diallyl acrylamides, etc.

The monomers possessing an ethylenically unsaturated group which are capable of copolymerizing with the aforesaid monomer possessing at least two ethylenically unsaturated groups include, styrene, vinyltoluene, acrylonitrile, alkyl acrylates (or methacrylates), vinyl esters, acrylic (or methacrylic) acid, hydroxyalkyl acrylates (or methacrylates), acrylamide (or methacrylamide), N-methylol acrylamide (or methacrylamide), N,N-dimethylaminopropyl acrylamide, etc.

Colorless core particles can be manufactured by polymerizing the aforesaid monomers in the presence of radical catalysts. This polymerization should preferably be conducted at the temperature of the boiling points or lower of the dispersion medium and the various monomers used. As radical catalysts, ordinary radical-generating catalysts such as organic peroxides or azo compounds are appropriate for the present purpose. The applicable peroxides include benzoyl peroxide, lauroyl peroxide and di-t-butyl peroxide, while the applicable azo compounds include, for example, 2,2'-azobisisobutyronitrile, 2,2'-azobis(2,4-dimethylvaleronitrile), etc.

Next, the core particles so obtained are treated with acidic treating agent under specified conditions. The treatment can be performed at a temperature in the range of from room temperature to 200° C. The bath ratio of the treatment is in the range of 1:2 to 1:50. Applicable acidic treating agents include concentrated sulfuric acid, fuming sulfuric acid, sulfur trioxide, sulfurous acid, sulfites, hydrogensulphites, sulfonyl chloride, chlorosulfuric acid, fluorosulfuric acid and aminosulfonic acid. One or more of the substances can be used for the present purpose.

When the core particles are treated with the acidic treating agent in this manner, the residual unreacted ethylenically unsaturated groups undergo addition reactions with the acidic treating agent, and/or the other functional groups on the surface of the core particles undergo addition reactions with the acidic treating agent. Thus, the acidic treating agent becomes chemically bonded to the core particles. In particular if a large amount of monomers possessing at least two ethylenically unsaturated groups are used, then the acidic treating agent mentioned above reacts with the ethylenically unsaturated groups remaining on the surface of the core particle to form sulfonic acid ester under comparatively gentle reaction conditions. If the core particles are manufactured using a monomer possessing an aromatic ring, then sulfonic acid groups can be introduced onto the said aromatic ring by means of sulfonation reactions.

Next, the colorless core particles which have been treated with acidic treating agent in the above manner are treated with a dye. The dyeing is appropriately performed at a temperature of 60° C.–120° C. for a period of 30 minutes to 15 hours, at a dye concentration of 0.5–5% by weight, with a bath ratio of 1:30 to 1:10. The pH of the dying solution is adjusted to a value in the range of 2–6 using acetic acid or sodium acetate. The dyes used for this purpose are, preferably, basic dyes which can combine chemically with the acidic treating agent which have been bonded to the aforesaid core particles as mentioned above. Generally, these basic dyes are hydrochlorides of aromatic bases containing chromophores. The basic groups may contain amino groups (—NH$_2$), alkylamino groups [—N(CH$_3$)$_2$], etc. The basic dyes contain no acidic groups, and when the basic dyes are dissolved in water, cations are formed. Specifically, the basic dyes include triphenylmethane derivatives, anthraquinone derivatives, azo compounds, methine compounds and oxazine derivatives, etc.

This coloring treatment induces ionic bonding of the basic dye to the sulfonic acid groups on the core particles, after which the colored particles can be recovered by selective filtration and washing. This treatment serves to eliminate the residual dye as well as the inorganic salts formed as by-products by the aforesaid reaction. Thus, colored particles in pure form, containing no alkali metals or other impurities can be obtained.

As described above, since the dyeing of the resin particles involves the chemical bonding of the dye to the resin particles, a uniform deep coloring can be achieved with a small amount of dye, moreover, the colored core particles so obtained possess excellent solvent tolerance. If such colored core particles are used for producing coated color particles of this invention, then the resulting coated color particles are preferably used as particulate spacers in liquid crystal display cells. Since the optical transmittance of such particles is low, high-quality liquid crystal display cells with excellent display contrast can be prepared.

Silane Compounds

Colorless or colored core particles are treated with a silane compound, thereby forming coating layers. The coating layer is formed for the purpose of preventing decoloration of the core particle. Alternatively, this layer formed by the treatment with the silane compounds serves as an intermediate layer. As described later, another coating layer can be formed on the surface of the intermediate layer, the said coating layer being formed by treatment of the surface of the intermediate layer by an agent selected from the group consisting of silyl isocyanates and organic titanium compounds.

The treatment of colorless or colored core particles with silane compounds can be accomplished, for example, by one of the following procedures.

<1> The core particles are immersed in a processing solution containing the appropriate silane compound. After filtering the mixture, the coated particles are dried.

<2> The processing solution containing the appropriate silane compound is applied to the core particles by spraying or daubing.

In the aforesaid procedure 1, the conditions for treatment such as the concentration of the processing solution, processing temperature and processing time are, for example, as follows.

One part by weight of the core particles is dispersed in 1–1000 parts by weight, preferably 5–500 parts by weight, of a suitable dispersant (to be described below), and to this dispersion 0.001–1 parts by weight, preferably 0.005–0.3 parts by weight, of the silane compound are added. After stirring this mixture for a period of 10 minutes to 12 hours, preferably 30 minutes to 6 hours, either at room temperature or elevated temperature, the dispersant is filtered and the obtained core particles are then heated at a temperature in the range of 40°–500° C. preferably 60°–400° C., for a period of 15 minutes to 12 hours, preferably 30 minutes to 5 hours.

The silane compounds used for the present invention include amino-type silane compounds, amine-type silane compounds, amide-type silane compounds, vinyl-type silane compounds, methacryl-type silane compounds, glycidyl-type silane compounds, and mercapto-type silane compounds. The amino-type silane compounds include, γ-aminopropyltrimethoxysilane, N-β-(aminoethyl)-γ-aminopropyltrimethoxysilane, 3-[N- allyl-N-(2-aminoethyl))aminopropyltrimethoxysilane, 3-(N-allyl-N-glycidyl)aminopropyltrimethoxysilane, 3-(N-allyl-N-methacryl)aminopropyltrimethoxysilane, 3-(N,N-diglycidyl)aminopropyltrimethoxysilane, and the like. The amino-type silane compounds include N,N-bis[(methyldimethoxysilyl)propyl]amine, N,N-bis[3-(trimethoxysilyl)propyl]amine, N,N-bis[3-(methyldimethoxysilyl)propyl]ethylenediamine, N,N-bis[3-(trimethoxysilyl)propyl]ethylenediamine, N-glycidyl-N,N-bis[3-(methyldimethoxysilyl)propyl]amine, N-glycidyl-N,N-bis[3-(trimethoxysilyl)propyl]amine, and the like. The amide-type silane compounds include N,N-bis[(methyldimethoxysilyl)propyl]methacryl amide, N,N-bis[3-(trimethoxysilyl)propyl]methacryl amide, and the like. The vinyl-type silane compounds include vinyltriethoxysilane, vinyltris(2-methoxyethoxy)silane, and the like. The methacryl-type silane compounds include γ-methacryloyloxypropyltrimethoxysilane, and the like. The glycidyl-type silane compounds include γ-glycidoxypropyltrimethoxysilane and the like. The mercapto-type silane compounds include γ-mercaptopropyltrimethoxysilane and the like. The amino-type and amide-type silanes are preferably used.

As the dispersion media, a mixture of organic solvent and water can be used. The organic solvent include alcohols such as methanol, ethanol, isopropanol, and the like; ketones such as acetone, methyl ethyl ketone, and the like; esters such as methyl acetate, ethyl acetate, and the like; ethers such as dioxane, tetrahydrofuran, methyl cellosolve, ethyl cellosolve, and the like. In the mixture, water is contained in an amount of 0.01 to 1 parts by weight, preferably, 0.05 to 0.5 parts by weight for every 1 part by weight of the organic solvent.

The silane compounds used for the present invention possess the property of reacting with hydroxyl groups and thereby forming polymer films. This property is attributed to the hydrolysis of terminal alkoxy groups by the small amount of water that is contained in the dispersion medium, and subsequent polycondensation of the hydrolysate. Presumably, the silane compound reacts either with the water molecules that exist on the surfaces of the core particles, or with hydroxyl groups possessed by the core particles, thereby forming the said polymer film.

Silyl Isocyanates

In order to diminish the decoloring of the colored core particles, the said colored core particles are treated with a silyl isocyanate, thereby forming a coating layer on the surfaces of the said colored core particles. Alternatively, this coating layer can be formed on the intermediate layer described in the section on "Silane Compounds".

The treatment of colored core particles (or core particles having an added intermediate layer) with silyl isocyanate can be accomplished, for example, by one of the following procedures.

<1> The said colored core particles are immersed in a processing solution containing a silyl isocyanate, and then after filtering off the processing solution the said colored core particles are dried.

<2> A processing solution containing a silyl isocyanate is applied to the said colored core particles by spraying or daubing, after which the resulting coated particles are dried.

<3> A silyl isocyanate is mechanically mixed with the colored core particles, and then the particles are dried.

Solvents preferably used for the aforesaid processing solution include aliphatic hydrocarbons such as n-hexane, esters such as ethyl acetate, and aromatic hydrocarbons such as benzene, toluene, or xylene.

In the aforesaid method 1, the silyl isocyanate compound is dissolved in the solvent, the colored core particles are immersed in this processing solution, and the solvent is evaporated while thoroughly mixing the ingredients, or the processing solution is filtered off with a suitable filtration device. The concentration of the processing solution and the processing conditions are the same as those used for treatment with the silane compound described above.

In method 2, the colored core particles are spread over a glass or metal plate, after which the processing solution can be applied to the said colored core particles by means of a spray gun or other suitable device. After application of the processing solution, heat treatment may be performed under the heating conditions described above.

In method 3, the colored core particles and the silyl isocyanate are placed in a mixing apparatus such as a ball mill, homogenizer or Henschel mixer, and after dry blending, heat treatment may be performed under the heating conditions described above.

The silyl isocyanates used for the present invention include triisocyanates, diisocyanates, monoisocyanates, and tetraisocyanatesilane. The triisocyanates include hydrogen silyltriisocyanate (HSi(NCO)$_3$), fluorosilyltriisocyanate (FSi(NCO)$_3$), methylsilyltriisocyanate (MeSi(NCO)$_3$), ethylsilyltriisocyanate (EtSi(NCO)$_3$), isopropylsilyltriisocyanate (i-PrSi(NCO)$_3$), n-propylsilyltriisocyanate (n-PrSi(NCO)$_3$), n-butylsilyltriisocyanate (n-BuSi(NCO)$_3$), methoxysilyltriisocyanate (MeOSi(NCO)$_3$), ethoxysilyltriisocyanate (EtOSi(NCO)$_3$), phenoxysilyltriisocyanate (C$_6$H$_5$OSi(NCO)$_3$), cyclohexylsilyltriisocyanate

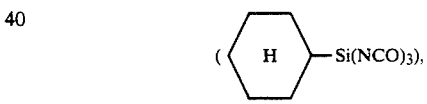

vinylsilyltriisocyanate (CH$_2$=CH—Si(NCO)$_3$), and the like. The diisocyanates include difluorosilyldiisocyanate (F$_2$Si(NCO)$_2$), dimethylsilyldiisocyanate (Me$_2$Si(NCO)$_2$), di-n-butylsilyldiisocyanate ((n-Bu)$_2$Si(NCO)$_2$), diphenylsilyldiisocyanate ((C$_6$H$_5$)$_2$Si(NCO)$_2$), dimethoxysilyldiisocyanate ((MeO)$_2$Si(NCO)$_2$), diethoxysilyldiisocyanate (EtO)$_2$Si(NCO)$_2$, and the like. The monoisocyanates include trimethylsilylisocyanate (Me$_3$SiNCO), triethylsilylisocyanate (Et$_3$SiNCO), triphenylsilylisocyanate (C$_6$H$_5$SiNCO), trifluorosilylisocyanate (F$_3$SiNCO), and the like.

As the dispersion media, a mixture of organic solvent and water can be used. The organic solvent include alcohols such as methanol, ethanol, isopropanol, and the like; ketones such as acetone, methyl ethyl ketone, and the like; esters such as methyl acetate, ethyl acetate, and the like; ethers such as dioxane, tetrahydrofuran, methyl cellosolve, ethyl cellosolve, and the like. In the mixture, water is contained in an amount of 0.01 to 1 parts by weight, preferably, 0.05 to 0.5 parts by weight for every 1 part by weight of the organic solvent.

By treating the colored core particles with a silyl isocyanate, a film with a reticulate structure can be formed on the surfaces of the colored core particles, thereby reducing the susceptibility of the particles to loss of the coloring agent.

By treating the colored core particles with a silane compound in the first process, followed by treatment with a silyl isocyanate in the second process, an intermediate layer and coating layer are successively formed on the surface of the colored core particle. As the coating layer that has a highly compact reticulate structure is formed on the intermediate layer, the susceptibility to decoloration can be greatly reduced.

In the process for producing a coated color particle having an intermediate layer and coating layer, the silyl isocyanate reacts with active hydrogen existing on the surface of the intermediate layer, thereby forming a polymer with the following structure.

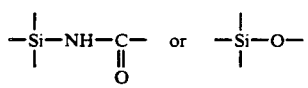

In this manner, a polymer layer with a highly compact three-dimensional reticulate structure is formed upon the intermediate layer that had been formed in the first process, thereby effectively preventing the elution of coloring agent even if the colored core particles are exposed to substances such as water, organic solvents, liquid crystals, acids, or bases.

Organic Titanium Compound

In order to diminish the decoloring of the colored core particles, and/or to improve dispersibility of the particles, the core particles are treated with an organic titanium compound, thereby forming a coating layer on the surface of the colored particles. Alternatively, this coating layer can be formed on the intermediate layer described in the section on "Silane Compounds".

The organic titanium compounds applicable for the present purpose include, for example, titanium tetraethoxide (Ti(OC$_2$H$_5$)$_4$), titanium tetrapropoxide (Ti(OC$_3$H$_7$)$_4$), titanium tetrabutoxide (Ti(OC$_4$H$_9$)$_4$), titanium tetrapentoxide (Ti(OC$_5$H$_{11}$)$_4$), titanium tetrahexoxide (Ti(OC$_6$H$_{13}$)$_4$), tetrakis(2-ethylhexoxide)titanium (Ti[OCH$_2$CH(C$_2$H$_5$)C$_4$H$_9$]$_4$), titanium tetradodecyloxide (Ti(OC$_{12}$H$_{25}$)$_4$), titanium tetrastearoxide (Ti(OC$_{17}$H$_{35}$)$_4$), titanium dipropoxide bis(acetylacetonate) (Ti(OC$_3$H$_7$)$_2$[OC(CH$_3$)CHCOCH$_3$]$_2$), titanium dibutoxide bis(triethanolaminate) (Ti(OC$_4$H$_9$)$_2$[OC$_2$H$_4$N(C$_2$H$_4$OH)$_2$]$_2$), titanium dihydroxide bis(lactate) (Ti(OH)$_2$[OCH(CH$_3$)COOH]$_2$), titanium propoxyoctylene glycolate (Ti[OCH$_2$CH(C$_2$H$_5$)CH(C$_3$H$_7$)OH]$_4$), etc. Among these, the compounds particularly desirable for the present purpose are titanium tetrapropoxide, titanium tetrabutoxide, tetrakis(2-ethylhexoxide)titanium, titanium dipropoxide bis(acetylacetonate) and titanium dibutoxide bis(triethanolaminate).

Examples of the solvent in which the organic titanium compound is dissolved include n-hexane, cyclohexane, benzene, toluene, trichlorethylene and Freon 113.

An appropriate method for applying the aforesaid organic titanium compounds onto the surfaces of the core particles includes the process of immersing the core particles in the aforesaid solution and evaporating the solvent while thoroughly mixing the ingredients. After evaporation of the solvent, heating at a temperature of 60° to 100° C. may be desirable if necessary.

It is presumed that the organic titanium compound applied on the surfaces of the core particles in the above-described manner reacts with the moisture in the ambient air, thereby undergoing hydrolysis and subsequent polycondensation. The polycondensation product (i.e., titanium oxide polymer) has the following formula:

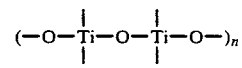

wherein n is an integer

The titanium oxide polymer layer contains alkyl groups originated from the organic titanium compound, and therefore the surfaces of the particles are presumed to become hydrophobic. The surfaces of the particles which have acquired hydrophobicity in this manner assume a dry state owing to a pronounced decrease in absorption of moisture from the air. As a result, when the particles with a titanium oxide polymer layer are used as particulate spacers for liquid crystal cells, the said spacers are extremely insusceptible to mutual aggregation. For this reason, when the particulate spacers are dispersed upon a glass substrate, the spacers exhibit an excellent state of dispersion.

Since the wettability of the core particle surfaces to organic titanium compounds is relatively poor, the adhesion of the resulting titanium oxide polymer layer to the core particles tends to be inadequate. Therefore, in order to ensure the desired adhesion of the titanium oxide polymer layer to the core particles, the core particles must be treated with a large amount of the organic titanium compound. However, if an intermediate layer is formed on the core particle surfaces by prior treatment with a silane compound, then, since the affinity between organic titanium compounds and the intermediate layer is excellent, a titanium oxide polymer layer can be efficiently formed over an extensive area of the core particle surfaces.

The amount of titanium oxide polymer formed on the surfaces of the core particles or intermediate layers, expressed in terms of weight of titanium, should preferably be in the range of 0.01 mg-500 mg, more preferably, 0.1 mg-100 mg per square meter of surface area of the core particles (or intermediate layers).

The silane compounds, silyl isocyanates and organic titanium compounds used in the present invention are inexpensive and easy to handle, moreover, the amounts used are small, therefore, the coated particles or coated color particles of the present invention can be produced in an extremely simple and economical manner.

EXAMPLES

The following materials were used in the examples to be described below.

(A) Core particles (1) Silica particles: SEAHOSTAR KE-P100, manufactured by Nippon Shokubai Kagaku Kogyo Co., Ltd.

(2) Melamine resin particles: UNIVEKS WA, manufactured by Unitika, Ltd.

(3) Polystyrene particles: SP-30, manufactured by Soken Chemical & Engineering Co., Ltd.

(4) Plastic particles: Polymer particles prepared by polymerizing divinylbenzene.

(B) Silane compounds (1) γ-aminopropyltrimethoxysilane: A-1100 manufactured by Nippon Unicar Co., Ltd.

(2) Vinyltriethoxysilane: A-151, manufactured by Nippon Unicar Co., Ltd.

(3) 3-(N,N-diglycidyl)aminopropyltrimethoxysilane: TSL8223, manufactured by Toshiba Silicone Co., Ltd.

(4) N,N-bis[3-(trimethoxysilyl)propyl]ethylenediamine: TSL8214, manufactured by Toshiba Silicone Co., Ltd.

(5) N,N-bis[3-(trimethoxysilyl)propyl]amine: TSL8208, manufactured by Toshiba Silicone Co., Ltd.

(6) γ-glycidoxypropyltrimethoxysilane: A-187, manufactured by Nippon Unicar Co., Ltd.

(7) γ-methacryloxypropyltrimethoxysilane: A-174, manufactured by Nippon Unicar Co., Ltd.

(8) γ-mercaptopropyltrimethoxysilane: A-189, manufactured by Nippon Unicar Co., Ltd.

(C) Silyl isocyanate compounds (1) Tetraisocyanatesilane: SI-400, manufactured by Matsumoto Chemical Co., Ltd.

(2) Methylsilyltriisocyanate: SI-310, manufactured by Matsumoto Chemical Co., Ltd.

(3) Trimethylsilylisocyanate: SI-130, manufactured by Matsumoto Chemical Co., Ltd.

(4) Phenylsilyltriisocyanate: SI-360, manufactured by Matsumoto Chemical Co., Ltd.

(D) Organic titanium compounds (1) Titaniumtetrabutoxide: Trade name B-1, manufactured by Nippon Soda Co., Ltd.

(2) Tetrakis(2-ethylhexoxide)titanium: Trade name TOT, manufactured by Nippon Soda Co., Ltd.

(3) Isopropyltri(N-aminoethyl-aminoethyl) titanate: KR44, manufactured by Ajinomoto Co., Ltd.

(4) Isopropyltridodecylbenzenesulfonyl titanate: KR9S, manufactured by Ajinomoto Co., Ltd.

(5) Isopropyltricumylphenyl titanate: KR34S, manufactured by Ajinomoto Co., Ltd.

(6) Isopropyltristearoyl titanate: KRTTS, manufactured by Ajinomoto Co., Ltd.

(E) Dyes (1) Basic dye CATIRON BLACK SBH: manufactured by Hodogaya Kagaku Co., Ltd.

(2) Disperse dye SUMIKARON BLACK EB(N): manufactured by Sumitomo Chemical Co., Ltd.

The methods used for measurement of physical properties of core particles were as follows.

(A) Measurement of mean particle size

This was performed with a Coulter Counter Model ZB/C-1000 particle size measuring apparatus.

(B) Test for dispersibility of particles

The dispersion characteristics of colored particles were assessed by means of an apparatus for the evaluation of the dispersion of particles illustrated in FIG. 1.

The said dispersion apparatus 5 possesses an air intake duct 1, a nozzle 2, a beaker 3, and a glass substrate 4. Compressed air is blown from the lower end of the nozzle 2 toward the beaker 3, the pressure of the said compressed air being set to 3 kg/cm$^2$, the temperature within the apparatus 5° to 50° C., and the duration of the air jet to 30 seconds. The glass substrate 4 used was a 15×15 cm square.

First, 0.1 g of particles were placed in a 100 ml beaker, air was released through the nozzle, and the said particles in the beaker were thereby dispersed onto the glass substrate. Nine observation zones of equal area were selected on the glass substrate, the number of particle clusters in which three or more particles had aggregated was counted in each observation zone, and the results were expressed in terms of the total number for the nine zones.

EXAMPLE 1

To 10 g of plastic particles with grain diameter of 8 μm, 100 g of concentrated sulfuric acid was added, and this mixture was heated at 55° C. for 6 hours. A dye bath was prepared by dissolving 6 g of a basic dye (CATIRON BLACK SBH) in 300 ml of water and adjusting the solution to pH 4 by adding acetic acid. The plastic particles which had been subjected to the aforesaid acid treatment were then added to this dye bath and dyed for 6 hours at 95° C., thereby obtaining black particles.

The particles so obtained were then dispersed in a mixed solution consisting of 100 g of water and 900 g of ethanol, 0.1 g of γ-aminopropyltrimethoxysilane (A-1100) were added to this dispersion, and the mixture was agitated for 3 hours at ordinary temperature. Next, the particles which were recovered by filtration of the mixture were heated at 200° C. for 5 hours, thereby obtaining the final coated color particles.

One gram aliquots of these color particles were separately dispersed in 100 ml of each of the dispersion mediums (all colorless) indicated in the following Table 1. These dispersions were then left for 500 hours at ordinary or elevated temperatures, and the degree of coloration of each dispersion medium was observed.

COMPARATIVE EXAMPLE 1

Black particles were obtained by the same procedures as used in Example 1, except that the particles were not treated with a silane compound. With respect to these particles, the degree of coloration of various dispersion mediums was observed in the same manner as in Example 1. The results obtained are shown in the following Table 2.

EXAMPLE 2

Black-dyed particles were obtained from polystyrene particles of grain diameter of 3 μm (SP-30) by the same procedure as in Example 1. Then, 10 g of the said particles were dispersed in a mixed solution consisting of 30 g of water and 70 g of isopropanol. Then, 1 g of vinyltriethoxysilane (A-151) was added to the dispersion, and the resulting mixture was agitated for 1 hour at ordinary temperature. Next, the mixture was filtered and the particles thus obtained were heated for 2 hours at 75° C., thereby obtaining the final coated color particles.

With respect to these particles, the degree of coloration of various dispersion mediums shown in Table 1 was observed in the same manner as in Example 1. The results were entirely similar to those displayed by the particles prepared in Example 1, with no visible coloration of the dispersion medium used in the test.

COMPARATIVE EXAMPLE 2

Black particles were obtained by the same procedures as used in Example 2, except that the particles were not treated with a silane compound. With respect to these particles, the degree of coloration of various dispersion mediums was observed in the same manner as in Example 1. The results obtained are shown in the following Table 2.

EXAMPLE 3

Silica particles of grain diameter of 1 μm (KE-P100) were dyed with basic dye, thereby obtaining blue particles. Then 10 g of the said particles were dispersed in a mixed solution consisting of 200 g of water and 800 g of acetone, 3 g of γ-methacryloxypropyltrimethoxysilane (A-174) were added to the dispersion, and the resulting mixture was agitated for 30 minutes at ordinary temperature. Next, the mixture was filtered and the particles so obtained were heated for 1 hour at 300° C., thereby obtaining the final coated color particles.

With respect to these particles, the degree of coloration of various dispersion mediums shown in Table 1 was observed in the same manner as in Example 1. The results were similar to those displayed by the particles prepared in Example 1, with no visible coloration of the dispersion medium used in the test.

COMPARATIVE EXAMPLE 3

Blue particles were obtained by the same procedures as used in Example 3, except that the particles were not treated with a silane compound. With respect to these particles, the degree of coloration of various dispersion mediums was observed in the same manner as in Example 1. The results obtained are shown in the following Table 2.

EXAMPLE 4

Melamine resin particles of grain diameter of 20 μm (UNIVEKS WA) were dyed with acidic dye, thereby obtaining red particles. Then, 10 g of the said particles were dispersed in a mixed solution consisting of 50 g of water and 450 g of tetrahydrofuran, 0.5 g of γ-mercaptopropyltrimetoxysilane (A-189) were added to the dispersion, and the resulting mixture was agitated for 6 hours at ordinary temperature. Next, the mixture was filtered and the particles so obtained were heated for 3 hours at 100° C., thereby obtaining the final coated color particles.

With respect to these particles, the degree of coloration of various dispersion mediums shown in Table 1 was observed in the same manner as in Example 1. The results were similar to those displayed by the particles prepared in Example 1, with no visible coloration of the dispersion medium used in the test

COMPARATIVE EXAMPLE 4

Red particles were obtained by the same procedures as used in Example 4, except that the particles were not treated with a silane compound.

With respect to these particles, the degree of coloration of various dispersion mediums was observed in the same manner as in Example 1. The results obtained are shown in the following Table 2.

EXAMPLE 5

Ten grams of black particles obtained by the same procedures as used in Example 1 were dispersed in a mixed solution consisting of 10 g of water and 90 g of ethanol. Then, 0.5 g of 3-(N,N-diglycidyl)aminopropyltrimethoxysilane (TSL8223) were added to the dispersion, and the resulting mixture was agitated for 1 hour at ordinary temperature. Next, the mixture was filtered and the particles so obtained were heated for 2 hours at 120° C., thereby obtaining final color particles.

With respect to these particles, the degree of coloration of various dispersion mediums shown in Table 1 was observed in the same manner as in Example 1. The results were similar to those displayed by the particles prepared in Example 1, with no visible coloration of the dispersion medium used in the test.

COMPARATIVE EXAMPLE 5

Black particles were obtained by the same procedures as used in Example 5, except that the particles were not treated with a silane compound. With respect to these particles, the degree of coloration of various dispersion mediums was observed in the same manner as in Example 1. The results obtained are shown in the following Table 2.

EXAMPLE 6

Ten grams of black particles obtained by the same procedures as used in Example 2 were dispersed in a mixed solution consisting of 60 g of water and 240 g of isopropanol. Then, 2 g of N,N-bis[3-(trimethoxysilyl)-propyl]ethylenediamine (TSL8214) were added to the dispersion, and the resulting mixture was agitated for 30 minutes at ordinary temperature. Next, the mixture was filtered and the particles so obtained were heated for 1 hour at 90° C., thereby obtaining the final coated color particles.

With respect to these particles, the degree of coloration of various dispersion mediums shown in Table 1 was observed in the same manner as in Example 1. The results were similar to those displayed by the particles prepared in Example 1, with no visible coloration of the dispersion medium used in the test.

COMPARATIVE EXAMPLE 6

Black particles were obtained by the same procedures as used in Example 6, except that the particles were not treated with a silane compound. With respect to these particles, the degree of coloration of various dispersion mediums was observed in the same manner as in Example 1. The results obtained are shown in the following Table 2.

EXAMPLE 7

Ten grams of blue particles obtained by the same procedures as used in Example 3 were dispersed in a mixed solution consisting of 20 g of water and 80 g of ethanol. Then, 0.5 g of N,N-bis[3-(trimethoxysilyl)-propyl]amine (TSL8208) were added to the dispersion, and the resulting mixture was agitated for 30 minutes at ordinary temperature. Next, the mixture was filtered and the particles so obtained were heated for 1 hour at 150° C., thereby obtaining the final coated color particles.

With respect to these particles, the degree of coloration of various dispersion mediums shown in Table 1 was observed in the same manner as in Example 1. The results were similar to those displayed by the particles prepared in Example 1, with no visible coloration of the dispersion medium used in the test.

COMPARATIVE EXAMPLE 7

Blue particles were obtained by the same procedures as used in Example 7, except that the particles were not treated with a silane compound. With respect to these particles, the degree of coloration of various dispersion mediums was observed in the same manner as in Example 1. The results obtained are shown in the following Table 2.

TABLE 1

| Dispersion medium | Water | Acetone | Ethanol | Liquid crystal (#4018[1]) | 0.1N H$_2$SO$_4$ | 0.1N NaOH |
|---|---|---|---|---|---|---|
| Temperature of medium | 80° C. | Ordinary temperature | Ordinary temperature | 80° C. | 80° C. | 80° C. |
| Color of medium | Colorless | Colorless | Colorless | Colorless | Colorless | Colorless |

[1]Manufactured by Chisso Corporation.

TABLE 2

| Dispersion medium | Water | Acetone | Ethanol | Liquid crystal (#4018[1]) | 0.1N H$_2$SO$_4$ | 0.1N NaOH |
|---|---|---|---|---|---|---|
| Temperature of medium | 80° C. | Ordinary temperature | Ordinary temperature | 80° C. | 80° C. | 80° C. |
| Comparative Example 1 | Black | Black | Black | Black | Black | Black |
| Comparative Example 2 | Black | Black | Black | Black | Black | Black |
| Comparative Example 3 | Blue | Blue | Blue | Blue | Blue | Blue |
| Comparative Example 4 | Red | Red | Red | Red | Red | Red |
| Comparative Example 5 | Black | Black | Black | Black | Black | Black |
| Comparative Example 6 | Black | Black | Black | Black | Black | Black |
| Comparative Example 7 | Blue | Blue | Blue | Blue | Blue | Blue |

[1]Manufactured by Chisso Corporation.

EXAMPLE 8

To 10 g of plastic particles with grain diameter of 10 μm, 100 g of concentrated sulfuric acid was added, and this mixture was heated at 55° C. for 6 hours. A dye bath was prepared by dissolving 6 g of a basic dye (CATIRON BLACK SBH) in 300 ml of water and adjusting the solution to pH 4 by adding acetic acid. The plastic particles which had been subjected to the aforesaid acid treatment were then added to this dye bath and dyed for 6 hours at 95° C., thereby obtaining black particles.

The particles so obtained were then dispersed in 200 g of ethyl acetate, 0.5 g of tetraisocyanatesilane (SI-400) were added to the dispersion, and then, the mixture was agitated for 2 hours at ordinary temperature. Next, the particles recovered by filtration of the mixture were heated at 250° C. for 4 hours, thereby obtaining the final coated color particles.

One gram aliquots of these color particles were separately dispersed in 100 ml of each of the dispersion mediums (all colorless) indicated in the following Table 3. These dispersions were then left for 500 hours at ordinary or elevated temperatures, and the degree of coloration of each dispersion medium was observed. The results obtained are indicated in Table 3.

COMPARATIVE EXAMPLE 8

Black particles were obtained by the same procedures as used in Example 8, except that the particles were not treated with a silyl isocyanate compound. With respect to these particles, the degree of coloration of various dispersion mediums was observed in the same manner as in Example 8. The results obtained are shown in the following Table 4.

EXAMPLE 9

Polystyrene particles of grain diameter of 3 μm (SP-30) were dyed by the same procedures as used in Example 8, thereby obtaining black particles. Then, 10 g of the said particles were dispersed in 500 g of n-hexane, 1.5 g of methylsilyltriisocyanate (SI-310) were added to the dispersion, and the resulting mixture was agitated for 3 hours at ordinary temperature. Next, the dispersion was filtered and the particles so obtained were heated for 1 hour at 150° C., thereby obtaining the final coated color particles.

With respect to these particles, the degree of coloration of various dispersion mediums shown in Table 3 was observed in the same manner as in Example 8. The results were similar to those displayed by the particles prepared in Example 8, with no visible coloration of the dispersion medium used in the test.

COMPARATIVE EXAMPLE 9

Black particles were obtained by the same procedures as used in Example 9, except that the particles were not treated with a silyl isocyanate compound. With respect to these particles, the degree of coloration of various dispersion mediums was observed in the same manner as in Example 8. The results obtained are shown in the following Table 4.

EXAMPLE 10

Silica particles of grain diameter of 1 μm (KE-P100) were dyed with basic dye, thereby obtaining blue particles. Then 10 g of the said particles were dispersed in 50 g of benzene, 5 g of trimethylsilylisocyanate (SI-130) were added to the dispersion, and the resulting mixture was agitated for 1 hour at ordinary temperature. Next, the mixture was filtered and the particles so obtained were heated for 30 minutes at 80° C., thereby obtaining the final coated color particles.

With respect to these particles, the degree of coloration of various dispersion mediums shown in Table 3 was observed in the same manner as in Example 8. The results were similar to those displayed by the particles prepared in Example 8, with no visible coloration of the dispersion medium used in the test.

COMPARATIVE EXAMPLE 10

Blue particles were obtained by the same procedures as used in Example 10, except that the particles were not treated with a silyl isocyanate compound. With respect to these particles, the degree of coloration of various dispersion mediums was observed in the same manner as in Example 8. The results obtained are shown in the following Table 4.

EXAMPLE 11

Melamine resin particles of grain diameter of 20 μm (UNIVEKS WA) were dyed with acidic dye, thereby obtaining red particles. Then 10 g of the said particles were dispersed in 100 g of tetrahydrofuran, 3 g of phenylsilyltriisocyanate (SI-360) were added to the dispersion, and the resulting mixture was agitated for 8 hours at ordinary temperature. Next, the mixture was filtered and the particles so obtained were heated for 7 hours at 50° C., thereby obtaining the final coated color particles.

With respect to these particles, the degree of coloration of various dispersion mediums shown in Table 3 was observed in the same manner as in Example 8. The results were similar to those displayed by the particles prepared in Example 8, with no visible coloration of the dispersion medium used in the test.

COMPARATIVE EXAMPLE 11

Red particles were obtained by the same procedures as used in Example 11, except that the particles were not treated with a silyl isocyanate compound. With respect to these particles, the degree of coloration of various dispersion mediums was observed in the same manner as in Example 8. The results obtained are shown in the following Table 4.

TABLE 3

| Dispersion medium | Water | Acetone | Ethanol | Liquid crystal (#4018[1]) | 0.1N $H_2SO_4$ | 0.1N NaOH |
|---|---|---|---|---|---|---|
| Temperature of medium | 80° C. | Ordinary temperature | Ordinary temperature | 80° C. | 80° C. | 80° C. |
| Color of medium | Colorless | Colorless | Colorless | Colorless | Colorless | Colorless |

[1]Manufactured by Chisso Corporation.

TABLE 4

| Dispersion medium | Water | Acetone | Ethanol | Liquid crystal (#4018[1]) | 0.1N $H_2SO_4$ | 0.1N NaOH |
|---|---|---|---|---|---|---|
| Temperature of medium | 80° C. | Ordinary temperature | Ordinary temperature | 80° C. | 80° C. | 80° C. |
| Comparative Example 8 | Black | Black | Black | Black | Black | Black |
| Comparative Example 9 | Black | Black | Black | Black | Black | Black |
| Comparative Example 10 | Blue | Blue | Blue | Blue | Blue | Blue |
| Comparative Example 11 | Red | Red | Red | Red | Red | Red |

[1]Manufactured by Chisso Corporation.

EXAMPLE 12

To 10 g of plastic particles with grain diameter of 10 μm, 100 g of concentrated sulfuric acid was added, and this mixture was heated at 55° C. for 6 hours. A dye bath was prepared by dissolving 6 g of a basic dye (CATIRON BLACK SBH) in 300 ml of water and adjusting the solution to pH 4 by adding acetic acid. The plastic particles which had been subjected to the aforesaid acid treatment were then added to this dye bath and dyed for 6 hours at 95° C., thereby obtaining black particles.

The particles so obtained were then dispersed in 100 g of toluene. Then, 0.5 g of titanium-tetrabutoxide (B-1) were added to the dispersion, and the mixture was agitated for 2 hours at ordinary temperature. Next, the particles recovered by filtration of the mixture were heated at 150° C. for 1 hour, thereby obtaining the final coated color particles.

One gram aliquots of these color particles were separately dispersed in 100 ml of each of the dispersion mediums (all colorless) indicated in the following Table 5. These dispersions were then left for 500 hours at ordinary or elevated temperatures, and the degree of coloration of each dispersion medium was observed. The results obtained are shown in Table 5.

COMPARATIVE EXAMPLE 12

Black particles were obtained by the same procedures as used in Example 12, except that the particles were not treated with a organic titanium compound. With respect to these particles, the degree of coloration of various dispersion mediums was observed in the same manner as in Example 12. The results obtained are shown in the following Table 6.

EXAMPLE 13

Ten grams of the black particles obtained by the same procedures as in Example 12 were dispersed in 200 g of ethanol. Then, 0.25 g of isopropyltri(N-aminoethyl-aminoethyl)titanate(KR44) were added to the dispersion, and the resulting mixture was agitated for 2 hours at ordinary temperature. Next, the mixture was filtered and the particles so obtained were heated for 30 minutes at 200° C., thereby obtaining the final coated color particles.

With respect to these particles, the degree of coloration of various dispersion mediums shown in Table 5 was observed in the same manner as in Example 12. The results were similar to those displayed by the particles prepared in Example 12, with no visible coloration of the dispersion medium used in the test.

COMPARATIVE EXAMPLE 13

Black particles were obtained by the same procedures as used in Example 13, except that the particles were not treated with an organic titanium compound. With respect to these particles, the degree of coloration of various dispersion mediums was observed in the same manner as in Example 12. The results obtained are shown in the following Table 6.

EXAMPLE 14

Polystyrene particles of grain diameter of 3 μm (SP-30) were dyed by the same procedures as in Example 12, thereby obtaining black particles. Then 10 g of the said particles were dispersed in 150 g of n-hexane, 2 g of isopropyltridodecylbenzenesulfonyl titanate (KR9S) were added to the dispersion, and the resulting mixture was agitated for 30 minutes at ordinary temperature. Next, the mixture was filtered and the particles so obtained were heated for 3 hours at 100° C., thereby obtaining the final coated color particles.

With respect to these particles, the degree of coloration of various dispersion mediums shown in Table 5 was observed in the same manner as in Example 12. The results were similar to those displayed by the particles prepared in Example 12, with no visible coloration of the dispersion medium used in the test.

COMPARATIVE EXAMPLE 14

Black particles were obtained by the same procedures as used in Example 14, except that the particles were not treated with an organic titanium compound. With respect to these particles, the degree of coloration of various dispersion mediums was observed in the same manner as in Example 12. The results obtained are shown in the following Table 6.

EXAMPLE 15

Silica particles of grain diameter of 1 μm (KE-P100) were dyed with basic dye, thereby obtaining blue particles. Then, 10 g of the said particles were dispersed in 300 g of benzene, 5 g of isopropyltricumylphenyl titanate (KR34S) were added to the dispersion, and the resulting mixture was agitated for 1 hour at ordinary temperature. Next, the mixture was filtered and the particles so obtained were heated for 30 minutes at 80° C., thereby obtaining the final coated color particles.

With respect to these particles, the degree of coloration of various dispersion mediums shown in Table 5 was observed in the same manner as in Example 12. The results were similar to those displayed by the particles prepared in Example 12, with no visible coloration of the dispersion medium used in the test.

COMPARATIVE EXAMPLE 15

Blue particles were obtained by the same procedures as used in Example 15, except that the particles were not treated with an organic titanium compound. With respect to these particles, the degree of coloration of various dispersion mediums was observed in the same manner as in Example 12. The results obtained are shown in the following Table 6.

EXAMPLE 16

Melamine resin particles of grain diameter of 20 μm (UNIVEKS WA) were dyed with acidic dye, thereby obtaining red particles. Then 10 g of the said particles were dispersed in 100 g of n-hexane, 2 g of isopropyltristearoyl titanate (KRTTS) were added to the dispersion, and the resulting mixture was agitated for 1 hour at ordinary temperature. Next, the mixture was filtered and the particles so obtained were heated for 1 hour at 150° C., thereby obtaining the final coated color particles.

With respect to these particles, the degree of coloration of various dispersion mediums shown in Table 5 was observed in the same manner as in Example 12. The results were similar to those displayed by the particles prepared in Example 12, with no visible coloration of the dispersion medium used in the test.

COMPARATIVE EXAMPLE 16

Red particles were obtained by the same procedures as used in Example 16, except that the particles were not treated with an organic titanium compound. With respect to these particles, the degree of coloration of various dispersion mediums was observed in the same manner as in Example 12. The results obtained are shown in the following Table 6.

TABLE 5

| Dispersion medium | Water | Acetone | Ethanol | Liquid crystal (#4018[1]) | 0.1N $H_2SO_4$ | 0.1N NaOH |
|---|---|---|---|---|---|---|
| Temperature of medium | 80° C. | Ordinary temperature | Ordinary temperature | 80° C. | 80° C. | 80° C. |
| Example 12 | Colorless | Colorless | Colorless | Colorless | Colorless | Colorless |
| Example 13 | Colorless | Colorless | Colorless | Colorless | Colorless | Colorless |
| Example 14 | Colorless | Colorless | Colorless | Colorless | Colorless | Colorless |
| Example 15 | Colorless | Colorless | Colorless | Colorless | Colorless | Colorless |
| Example 16 | Colorless | Colorless | Colorless | Colorless | Colorless | Colorless |

[1] Manufactured by Chisso Corporation.

TABLE 6

| Dispersion medium | Water | Acetone | Ethanol | Liquid crystal (#4018[1]) | 0.1N $H_2SO_4$ | 0.1N NaOH |
|---|---|---|---|---|---|---|
| Temperature of medium | 80° C. | Ordinary temperature | Ordinary temperature | 80° C. | 80° C. | 80° C. |
| Comparative Example 12 | Black | Black | Black | Black | Black | Black |
| Comparative Example 13 | Black | Black | Black | Black | Black | Black |
| Comparative Example 14 | Black | Black | Black | Black | Black | Black |
| Comparative Example 15 | Blue | Blue | Blue | Blue | Blue | Blue |
| Comparative Example 16 | Red | Red | Red | Red | Red | Red |

[1] Manufactured by Chisso Corporation.

EXAMPLE 17

A dye bath was prepared by dissolving 50 g of a basic dye (CATIRON BLACK SBH) in 3 liters of water and adjusting the solution to pH 5 by adding sodium carbonate. Next, 100 g of a cross-linked styrenedivinylbenzene (40:60 weight ratio) copolymer in the form of particles with diameter of 6.5 μm were added to this dye bath, then the mixture was loaded into a 5 l-autoclave and dyed for 6 hours at 120° C., thereby obtaining black core particles.

The particles so obtained were then dispersed in a mixed solution consisting of 200 g of water and 1800 g of ethanol. Then, 3 g of γ-aminopropyltrimethoxysilane (A-1100) was added to the dispersion, and the mixture was agitated for 2 hours at ordinary temperature. Next, the particles recovered by filtration of the said mixture were heated for 2 hours at 150° C.

Next, the particles which had been obtained by the above-mentioned process were dispersed in a processing solution obtained by dissolving 5 g of tetraisocyanatesilane (SI-400) in 2 liters of toluene, and the mixture was stirred for 1 hour at ordinary temperature. Next, the particles obtained by filtering this mixture were heated for 1 hour at 150° C., thereby obtaining the final coated color particles.

One gram aliquots of the coated color particles so obtained were separately dispersed in 100 ml of each of the dispersion mediums (all colorless) shown in the following Table 7. The particles were then left immersed in these mediums for 200 hours at ordinary or elevated temperatures, and the mediums were examined for the degree of coloration due to the elution of dye into the mediums. The results of these tests are shown in Table 7.

COMPARATIVE EXAMPLE 17

One gram aliquots of the black core particles obtained in Example 17 were subjected to the same tests as shown in Example 17, and the degree of coloration of the various mediums was observed, with the results shown in Table 8.

EXAMPLE 18

A dye bath was prepared by dissolving 50 g of a disperse dye (SUMIKARON BLACK EB(N)) in 3 liters of water and adjusting the solution to pH 5 by adding acetic acid. Next, 100 g of a cross-linked divinylbenzene-dipentaerythritolacrylate (80:20 weight ratio) copolymer in the form of particles with diameter of 8.0 μm were added to this dye bath, then the mixture was loaded into a 5 l-autoclave and dyed for 5 hours at 130° C. thereby obtaining black core particles.

The core particles so obtained were treated with γ-aminopropyltrimethoxysilane (A-1100) and then with tetraisocyanatesilane by the same procedures as used in Example 17.

With respect to these particles, the degree of coloration of various dispersion mediums shown in Table 7 was observed in the same manner as in Example 17. The results are shown in Table 9.

COMPARATIVE EXAMPLE 18

One gram aliquots of the black core particles obtained in Example 18 were subjected to the same tests as shown in Example 18, and the degree of coloration of the various mediums was observed, with the results shown in Table 10.

TABLE 7

| (Example 17) | | | | | | |
|---|---|---|---|---|---|---|
| Dispersion medium | Water | Acetone | Ethanol | Liquid crystal (#4018[1]) | 0.1N $H_2SO_4$ | 0.1N NaOH |
| Temperature of medium | 80° C. | Ordinary temperature | Ordinary temperature | 80° C. | 80° C. | 80° C. |
| Color of medium | Colorless | Colorless | Colorless | Colorless | Colorless | Colorless |

[1] Manufactured by Chisso Corporation.

TABLE 8

| (Comparative Example 17) | | | | | | |
|---|---|---|---|---|---|---|
| Dispersion medium | Water | Acetone | Ethanol | Liquid crystal (#4018[1]) | 0.1N $H_2SO_4$ | 0.1N NaOH |
| Temperature of medium | 80° C. | Ordinary temperature | Ordinary temperature | 80° C. | 80° C. | 80° C. |
| Color of medium | Black | Black | Black | Black | Black | Black |

[1] Manufactured by Chisso Corporation.

TABLE 9

| (Example 18) | | | | | | |
|---|---|---|---|---|---|---|
| Dispersion medium | Water | Acetone | Ethanol | Liquid crystal (#4018[1]) | 0.1N $H_2SO_4$ | 0.1N NaOH |
| Temperature of medium | 80° C. | Ordinary temperature | Ordinary temperature | 80° C. | 80° C. | 80° C. |
| Color of medium | Colorless | Colorless | Colorless | Colorless | Colorless | Colorless |

[1] Manufactured by Chisso Corporation.

TABLE 10

| (Comparative Example 18) | | | | | | |
|---|---|---|---|---|---|---|
| Dispersion medium | Water | Acetone | Ethanol | Liquid crystal (#4018[1]) | 0.1N $H_2SO_4$ | 0.1N NaOH |
| Temperature of medium | 80° C. | Ordinary temperature | Ordinary temperature | 80° C. | 80° C. | 80° C. |
| Color of medium | Gray | Black | Black | Gray | Gray | Gray |

[1] Manufactured by Chisso Corporation.

EXAMPLE 19

A solution obtained by dissolving 0.08 g of titanium tetrabutoxide (B-1) in 15 ml of n-hexane was added to 10 g of plastic particles with grain diameter of 10 μm and after mixing thoroughly, the n-hexane was evaporated. Next, this material was thoroughly ground in a mortar.

The dispersion characteristics of the ground particles were assessed. The results were shown in Table 11.

EXAMPLE 20

Ten grams of the same plastic particles as used in Example 19 were dispersed in a mixed solution of 100 g of water and 900 g of ethanol. Then, 0.1 g of γ-aminopropyltrimethoxysilane (A-1100) was added to this dispersion, and the mixture was agitated for 3 hours at ordinary temperature. Next, the mixture was filtered and the particles so obtained were heated for 5 hours at 200° C.

Next, a solution obtained by dissolving 0.08 g of titanium tetrabutoxide (B-1) in 15 ml of n-hexane was added to particles obtained by the above-mentioned process, and after mixing thoroughly, the n-hexane was evaporated. Next, this material was thoroughly ground in a mortar.

The dispersion characteristics of the ground particles were assessed, with the results shown in Table 11.

COMPARATIVE EXAMPLE 19

The plastic particles were prepared by the same procedures as in Example 19, except that the plastic particles were not treated with a titanium compound. The dispersion characteristics of the plastic particles were assessed. The results are shown in Table 11.

EXAMPLE 21

A solution obtained by dissolving 0.15 g of titanium tetrabutoxide (B-1) in 15 ml of n-hexane was added to 10 g of polystyrene particles with grain diameter of 3 μm and after mixing thoroughly, the n-hexane was evaporated. Next, this material was thoroughly ground in a mortar.

The dispersion characteristics of the ground particles were assessed. The results were shown in Table 11.

EXAMPLE 22

Ten grams of the same polystyrene particles as used in Example 21 were dispersed in a mixed solution of 30 g of water and 70 g of isopropanol. Then, 1 g of γ-glycidoxypropyltrimethoxysilane (A-187) was added to this dispersion, and the mixture was agitated for 1 hour at ordinary temperature. Next, the mixture was filtered and the particles so obtained were heated for 2 hours at 75° C.

Next, a solution obtained by dissolving 0.15 g of titanium tetrabutoxide (B-1) in 15 ml of n-hexane was added to particles obtained by the above-mentioned process, and after mixing thoroughly, the n-hexane was evaporated. Next, this material was thoroughly ground in a mortar.

The dispersion characteristics of the ground particles were assessed, with the results shown in Table 11.

COMPARATIVE EXAMPLE 20

The polystyrene particles were prepared by the same procedures as in Example 21, except that the polystyrene particles were not treated with a titanium compound. The dispersion characteristics of the polystyrene particles were assessed. The results are shown in Table 11.

EXAMPLE 23

A solution obtained by dissolving 0.3 g of tetrakis(2-ethylhexoxy)titanium (TOT) in 15 ml of n-hexane was added to 10 g of silica particles with grain diameter of 1 μm (KE-P100) and after mixing thoroughly, the n-hexane was evaporated. Next, this material was thoroughly ground in a mortar.

The dispersion characteristics of the ground particles were assessed. The results were shown in Table 12.

EXAMPLE 24

Ten grams of the same silica particles as used in Example 23 were dispersed in a mixed solution of 200 g of water and 800 g of acetone. Then, 3 g of γ-methacryoxypropyltrimethoxysilane (A-174) was added to this dispersion, and the mixture was agitated for 30 minutes at ordinary temperature. Next, the mixture was filtered and the particles so obtained were heated for 1 hour at 300° C.

Next, a solution obtained by dissolving 0.3 g of tetrakis(2-ethylhexoxy)titanium (TOT) in 15 ml of n-hexane was added to particles obtained by the above-mentioned process, and after mixing thoroughly, the n-hexane was evaporated. Next, this material was thoroughly ground in a mortar.

The dispersion characteristics of the ground particles were assessed, with the results shown in Table 12.

COMPARATIVE EXAMPLE 21

The silica particles were prepared by the same procedures as in Example 23, except that the silica particles were not treated with a titanium compound. The dispersion characteristics of the silica particles were assessed. The results are shown in Table 12.

EXAMPLE 25

Ten grams of plastic particles with grain diameter of 8 μm were dispersed in a mixed solution of 50 g of water and 450 g of ethanol. Then, 1 g of N,N-bis[3-(trimethoxysilyl)propyl]ethylenediamine (TSL8214) was added to the dispersion and the resulting mixture was agitated for 30 minutes at ordinary temperature. Next, the particles obtained by filtering the said mixture were heated for 2 hours at 100° C.

Then, a solution obtained by dissolving 0.1 g of titanium tetrabutoxide (B-1) in 15 ml of n-hexane was added to the particles obtained in the above-mentioned manner, and after mixing thoroughly, the n-hexane was evaporated. Next, this material was thoroughly ground in a mortar.

The titanium content of the particles so obtained was quantitated by the following method. After treating the samples with sulfuric acid and nitric acid, the titanium content of the liquid so obtained was measured by means of an ICP emission spectrometer. The results of these measurements revealed that the amount of titanium per square meter of surface area of the said particles was 2.2 mg, close to the theoretically calculated value.

The dispersion characteristics of these particles were assessed. The results are shown in Table 12.

EXAMPLE 26

Coated color particles were obtained by the same method as used in Example 25, except that the plastic particles were not treated with a silane compound. The amount of titanium per square meter of surface area of the said particles was 0.19 mg, approximately one-twelfth of the theoretically calculated value.

The dispersion characteristics of these particles were assessed, with the results shown in Table 12.

TABLE 11

| The number of particles forming one cluster | The number of clusters | | | | | |
|---|---|---|---|---|---|---|
| | Example 19 | Example 20 | Comparative Example 19 | Example 21 | Example 22 | Comparative Example 20 |
| 3 | 33 | 35 | 32 | 36 | 30 | 28 |
| 4 | 9 | 3 | 21 | 14 | 5 | 24 |
| 5 | 6 | 1 | 17 | 8 | 2 | 15 |
| 6 | 4 | 2 | 17 | 6 | 1 | 20 |
| 7 | 2 | 0 | 4 | 1 | 1 | 11 |

TABLE 11-continued

| The number of particles forming one cluster | The number of clusters | | | | | |
|---|---|---|---|---|---|---|
| | Example 19 | Example 20 | Comparative Example 19 | Example 21 | Example 22 | Comparative Example 20 |
| 8 or more | 1 | 0 | 14 | 1 | 0 | 6 |
| Total number of clusters | 55 | 41 | 105 | 60 | 39 | 104 |
| Percentage of clusters consisting of 3 particles | 60% | 85% | 30% | 55% | 77% | 27% |

TABLE 12

| The number of particles forming one cluster | The number of clusters | | | | |
|---|---|---|---|---|---|
| | Example 23 | Example 24 | Comparative Example 21 | Example 25 | Example 26 |
| 3 | 30 | 32 | 25 | 34 | 34 |
| 4 | 12 | 7 | 27 | 12 | 10 |
| 5 | 8 | 4 | 21 | 2 | 5 |
| 6 | 5 | 1 | 21 | 1 | 3 |
| 7 | 3 | 1 | 10 | 0 | 2 |
| 8 or more | 2 | 0 | 8 | 0 | 2 |
| Total number of clusters | 60 | 45 | 112 | 39 | 56 |
| Percentage of clusters consisting of 3 particles | 50% | 71% | 22% | 87% | 61% |

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A coated colored particle comprising:
   (a) a colored core particle made of a resin or glass; and
   (b) a coating layer formed on the surface of said core particle,
   wherein said coating layer is formed by treatment of said core particle with an agent selected from the group consisting of silane compounds, silyl isocyanates, and organic titanium compounds.

2. A coated colored particle according to claim 1, further comprising
   (c) an intermediate layer disposed between the surface of said core particle and said coating layer,
   wherein said intermediate layer is formed by treatment of said core particle with a silane compound, and
   said coating layer is formed by treatment of the surface of said intermediate layer with a silyl isocyanate.

3. A coated colored particle according to claim 1, further comprising:
   (c) an intermediate layer disposed between the surface of said core particle and said coating layer,
   wherein said intermediate layer is formed by treatment of said core particle with a silane compound, and
   said coating layer is formed by treatment of the surface of said intermediate layer with an organic titanium compound.

4. A particulate spacer for liquid crystal display cells comprising a coated colored particle of claim 1.

5. A particulate spacer for liquid crystal display cells comprising a coated colored particle of claim 2.

6. A particulate spacer for liquid crystal display cells comprising a coated colored particle of claim 3.

7. A colored particle comprising a colored core particle, which consists essentially of at least one coloring member of the group consisting of dyes and pigments, and at least one member selected from the group consisting of resin and glass; and a coating on said colored core particle comprising the product of contacting said colored core particle with at least one member selected from the group consisting of a silane, a silyl isocyanate, and an organic titanium compounds.

8. A coated colored particle as claimed in claim 7 wherein said coating comprises a first layer adjacent said core particle consisting essentially of a product resulting from the contact of said core particle surface with a silane; and a second layer on said first layer comprising at least one member selected from the group consisting of a silyl isocyanate and an organo-titanium.

9. A coated colored particle as claimed in claim 7 wherein said core particle is one member selected from the group consisting of: polyethylene, polypropylene, poly(methyl)pentene, polyvinyl chloride, polytetrafluoroethylene, polystyrene, polymethyl methacrylate, polyethylene terephthalate, polybutylene terephthalate, polyamide, polyimides, polysulfones, polyphenylene oxide, polyacetal, epoxy resins, phenolic resins, melamine resins, unsaturated polyester resins, polydivinyl benzene, divinyl benzene-styrene copolymer, divinyl benzene-acrylate copolymers, polydiallyl phthalate, polytriallyl isocyanurate, polybenzoguanamine, silicate glass, borosilicate glass, lead glass, soda-lime glass, alumina, and aluminosilicate.

10. A coated colored particle as claimed in claim 7 wherein said core particle is spherical, having an average diameter of about 0.1 $\mu$m to 1,000 $\mu$m; ellipsoidal, having an average short axis diameter of about 0.1 $\mu$m to 1,000 $\mu$m and a ratio of long axis diameter to short axis diameter of about 1 to 10; or cylindrical having an average diameter of about 0.5 $\mu$m to 1,000 $\mu$m and a ratio of length to diameter of about 1 to 50.

11. A coated colored particle as claimed in claim 7 wherein said silane is at least one member selected from the group consisting of amino silanes, amido silanes, vinyl silanes, methacrylyl silanes, glycidyl silanes, and mercapto silanes.

12. A coated colored particle as claimed in claim 7 wherein said silyl isocyanate is at least one member selected from the group consisting of hydrogen silyltriisocyanate, fluoro silyl triisocyanate, methyl silyl triisocyanate, ethyl silyl triisocyanate, isopropyl silyl triisocyanate, n-propyl silyl triisocyanate, n-butyl silyl triisocyanate, methoxy silyl triisocyanate, ethoxy silyl triisocyanate, phenoxy silyl triisocyanate, cyclohexyl silyl triisocyanate, vinyl silyl triisocyanate, difluoro silyl diisocyanate, dimethyl silyl diisocyanate, di-n-butyl silyl diisocyanate, diphenyl silyl diisocyanate, dimethoxy silyl diisocyanate, diethoxy silyl diisocyanate, trimethyl silyl isocyanate, triethyl silyl isyocyanate, triphenyl silyl isocyanate, and trifluoro silyl isocyanate.

13. A coated colored particle as claimed in claim 7 wherein said organo-titanium compound is at least one member selected from the group consisting of titanium tetraethoxide, titanium tetrapropoxide, titanium tetrabutoxide, titanium tetrapentoxide, titanium tetrahexoxide, tetrakis(2-ethyl hexoxide)titanium, titanium tetradodecyloxide, titanium tetrastearyloxide, titanium dipropoxide bis(acetylacetonate), titanium dibutoxide bis(triethanolamine), titanium dihydroxide bis(lactate), and titanium propoxyoctylene glycolate.

14. A coated colored particle as claimed in claim 8 wherein said external surface of said coating on said particle is the titanium oxide polymer reaction product of said organotitanium compound and water.

15. A coated colored particle as claimed in claim 8 wherein said external surface of said coating on said particle is a silyl isocyanate film of reticulate structure.

16. A coated colored particle as claimed in claim 8 wherein said coating on said particle is layered and wherein said layers are applied successively.

17. A coated colored particle as claimed in claim 14 wherein said titanium oxide polymer external surface on said particle is 0.01 to 500 mg per square meter of core particle surface area.

18. A liquid crystal display cell comprising a liquid crystal and a spacer consisting essentially of the coated colored particle as claimed in claim 7.

19. A liquid crystal display cell comprising a liquid crystal and a spacer consisting essentially of the coated colored particle as claimed in claim 8.

20. A coated colored particle as claimed in claim 7 wherein said external surface comprises the product of contacting said colored core particle with a silane.

* * * * *